P. M. LINCOLN.
METERING SYSTEM.
APPLICATION FILED JAN. 7, 1911.
1,137,873.
Patented May 4, 1915.
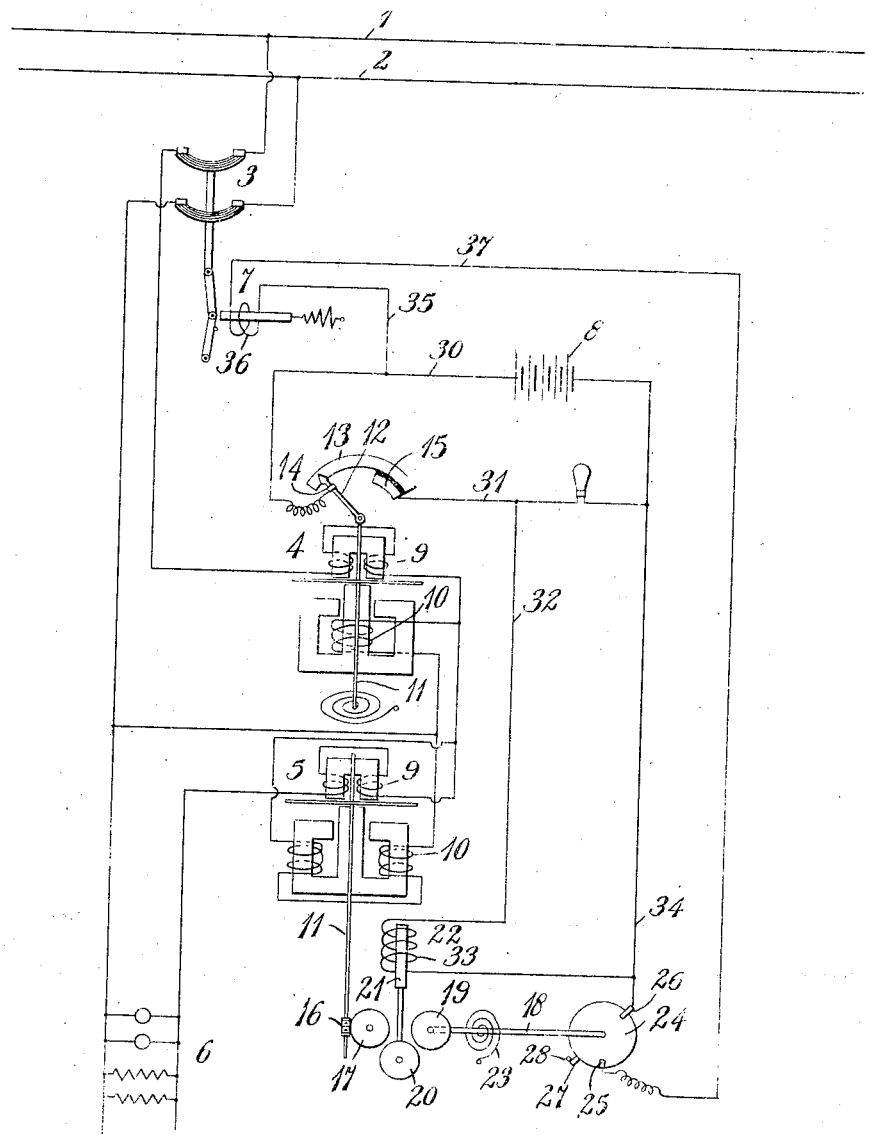
WITNESSES
Fred H. Miller
D. H. Moore
INVENTOR
Paul M. Lincoln
BY
Schuyler Barn
ATTORNEY

UNITED STATES PATENT OFFICE.

PAUL M. LINCOLN, OF PITTSBURGH, PENNSYLVANIA, ASSIGNOR TO WESTINGHOUSE ELECTRIC AND MANUFACTURING COMPANY, A CORPORATION OF PENNSYLVANIA.

METERING SYSTEM.

1,137,873.     Specification of Letters Patent.     Patented May 4, 1915.

Application filed January 7, 1911. Serial No. 601,327.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Metering Systems, of which the following is a specification.

My invention relates to metering systems, and it has for its object to provide a system of the above-indicated class which shall be simple in arrangement, reliable in operation and particularly adapted, in addition to its usual function, to automatically disconnect a distributing system or a translating device from a supply circuit when the integrated amount of power continuously consumed in excess of a predetermined effective value exceeds a predetermined amount in a given time.

It is customary for power companies to base their charges upon the unusual power consumption or "peak demands" as well as upon the total amount of power consumed, in order to fix the expense of the reserve apparatus and its maintenance upon those for whose benefit it is installed. Such "peak demands" are usually obtained by means of so called "maximum demand" wattmeters which are adapted to register the amount of power that traverses a circuit in a given interval of time and to record the "maximum demand" for this time interval for each hour of the day. However, in order to protect the service and apparatus and to minimize the disturbing effects of heavy peak loads, the power companies usually stipulate a severe penalty in case any one of the recorded "maximum demands" exceeds a prescribed ultimate value within a given time. In the prior art, this penalty has been based upon the greatest "maximum demand" figures.

Usually the operation of the hereinbefore mentioned "maximum demand" wattmeter has been controlled arbitrarily by a clock mechanism which successively sets off given time intervals, instantly resets and periodically repeats the operation. Thus, if the resetting operation should occur during a peak load, a continuous record thereof is not obtained, but it is divided into two time periods, neither of which may be excessive, although the peak, as a whole, may have greatly exceeded the ultimate value. It will be seen, therefore, that, for this class of work, the "maximum demand" meter should depend upon conditions of the electric circuit and not arbitrarily upon time.

According to my present invention, I provide means based upon this principle which is adapted to automatically open the main circuit breakers when the integrated amount of power continuously consumed in excess of a predetermined effective value exceeds a predetermined amount in a given time. I accomplish such a result by employing the customary integrating and indicating wattmeters and providing a rotatable member, having coöperating contact members, which is adapted to be operatively associated with the shaft of the integrating wattmeter when, and as long as, the indicating wattmeter indicates in excess of a predetermined effective value.

For example, if the prescribed ultimate "peak demand" is 1200 KWs for a five minute period of time, or its equivalent, suitable means are arranged on the indicating wattmeter to effect the operative association of the rotatable member with the integrating wattmeter when the pointer of the indicating wattmeter registers 1200 KWs. By properly designing the gear reduction and the disposition of the contact members on the rotatable member, a circuit through the trip coil of the main circuit breaker is established when the power consumption totals 100 KW hours. It is evident that, if the power demand continues at 1200 KW, the apparatus will be disconnected from the supply circuit at the expiration of five minutes, while, if the demand is in excess of 1200 KWs, the main circuit breakers are tripped out in a proportionately less period of time, as will be readily understood by those skilled in the art.

In order to prevent cutting off all the power supplied to a given user, it may be desirable to provide a multiplicity of contact members, the first being arranged to interrupt a small and comparatively unimportant part of the power; the second to interrupt another portion of the power, and so on, until finally the last contact member opens the main breakers provided the rate of power consumption has not been sufficiently reduced by the previous reductions of power.

It should be noted that in carrying out my invention, I utilize the integrating and indicating wattmeters that are usually provided upon the switchboards of the consumers, merely by making a few slight modifications and additions whereby the meters are adapted to perform the desired functions without, in any way, interfering with or affecting their normal operation. By thus employing the usual standard instruments for a double purpose, economies in space and in cost of apparatus are effected, complicated systems of wiring are avoided, and reductions in the expense of installation and maintenance are secured.

The single figure of the accompanying drawing is a diagrammatic view of a system embodying my invention.

Referring to the drawing in detail, a supply circuit 1—2 is adapted to deliver energy through a circuit interrupter 3, an indicating wattmeter 4, and an integrating wattmeter 5 to a plurality of translating devices 6. The circuit interrupter 3 may be of any well-known type of construction and is provided with a trip coil 7 which is adapted to be energized, under predetermined conditions, by a battery 8 or other suitable source of energy.

The indicating wattmeter 4 and the integrating wattmeter 5 may also be of any well-known type of construction and each embodies a series coil 9, a shunt coil 10 and a main shaft 11.

Inasmuch as the construction, the mode of operation and the circuit connections of devices of these types are old and familiar in the art, no detailed description of the same is considered necessary.

The shaft 11 of the indicating meter 4 is provided with a pointer 12, which is adapted to traverse a suitable scale 13 and to indicate the effective value of the power taken by the translating devices 6. The pointer 12 carries a movable contact member 14 which is adapted to coöperate with an adjustable stationary contact segment 15 under predetermined power conditions of the circuit.

The shaft 11 of the integrating wattmeter 5 rotates at variable speeds in accordance with the amount of energy passing through the meter and is provided with a worm 16 and a coöperating worm wheel 17 by means of which the rotational movement of the meter shaft may be imparted to an auxiliary shaft 18, through the agency of gear wheels 19 and 20, the latter being brought into operative engagement with the gear wheels 17 and 19 under predetermined power conditions.

The idler gear wheel 20 is suitably suspended from a movable core member 21 of an electromagnet 22 which is adapted to be energized when coöperative engagement of the contact members 14 and 15 is effected.

The auxiliary shaft 18 is biased to its initial position by a spiral spring 23 and is provided with a disk member 24 having a movable contact member 25 which is adapted to coöperate with an adjustable stationary contact member 26.

In order to limit the counter clockwise rotative movement of the disk member 24 in its resetting operation, a projection 27 is provided thereon to engage a suitable stop 28 in its initial position.

When the auxiliary shaft 18 is operatively connected to the shaft 11 of the integrating wattmeter 5 by means of the idler gear wheel 20, the disk member 24 is rotated in proportion to the amount of energy passing through the integrating wattmeter, as will be readily understood.

Assuming the translating devices to be operating under normal conditions and the various parts of the apparatus to occupy the positions shown, the operation of the system is as follows:

It will be noted that, on account of the position of the pointer 12 of the indicating wattmeter 4, coöperative engagement of the contact members 14 and 15 is not effected and, hence, the shaft 18 is not operatively associated with the integrating wattmeter 5.

If the load upon the translating devices 6 should be increased sufficiently to cause the engagement of the coöperating contact members 14 and 15, a circuit would be established from the positive side of the battery 8 through conductor 30, movable contact member 14, stationary contact segment 15, conductor 31, conductor 32, winding 33 of the electromagnet 22, and conductor 34 to the negative side of the battery. The electromagnet 22 would accordingly be energized and the idler gear wheel 20 be raised into coöperative engagement with the gear wheels 17 and 19, thereby effecting an operative connection between the auxiliary shaft 18 and the integrating wattmeter shaft 11.

If the power taken by the translating devices 6 should continue to be in excess of the value for which the stationary contact segment 15 of the indicating wattmeter 4 is adjusted, the movable contact member 25 on the disk 24 would be rotated at variable speeds until it engaged the stationary contact member 26, said engagement being effected when the total integrated amount of power continuously consumed in excess of a predetermined effective value exceeds a predetermined amount within a given time. A circuit would thus be established from the positive side of the battery 8, through conductor 30, conductor 35, winding 36 of the trip coil 7, conductor 37, movable contact member 25, stationary contact member 26, and conductor 34 to the negative side of the battery. Upon the completion of the circuit just traced, energy is supplied to the trip coil 7 of the circuit interrupter 3 and said interrupter is opened, thereby disconnecting the translating devices from the supply circuit and avoiding a consumption of power in excess of the prescribed ultimate "peak demand."

In case the effective value of power taken by the translating devices 6, as shown by the indicating wattmeter 4, should fall below the predetermined figure, subsequent to the operative association of the auxiliary shaft 18 and the meter shaft 11, it is evident that a separation of the contact members 14 and 15 would take place and the auxiliary shaft 18 would be immediately disconnected and returned to its initial position by means of the spring 23.

Although I have shown and described my invention in connection with a single-phase system, those skilled in the art will readily understand that it is also applicable to polyphase or direct current systems. Furthermore, various modifications may be effected in the structural details and in the arrangement and location of parts without departing from the spirit of my invention, and I desire that such modifications shall be included within its scope.

I claim as my invention:

1. The combination with a circuit interrupter, and an indicating wattmeter in circuit therewith and an integrating wattmeter, of a movable member, means dependent upon said indicating wattmeter for operatively associating said movable member with said integrating wattmeter, and means dependent upon the movement of said movable member for actuating said interrupter.

2. The combination with a circuit interrupter, and an integrating wattmeter in circuit therewith and an indicating wattmeter, of a movable member biased to its initial position, means dependent upon said indicating wattmeter for operatively associating said movable member with said integrating wattmeter, and means associated with said movable member and dependent upon the degree of movement thereof for actuating said interrupter.

3. In an electrical system of distribution, the combination with a translating device, an integrating wattmeter for registering the amount of energy consumed thereby, an indicating wattmeter for measuring the effective value of the energy supplied thereto, and a circuit interrupter in circuit with said translating device and said meters, of an auxiliary rotary switching device adapted to be driven by said integrating wattmeter and to effect the opening of said interrupter, and means associated with said indicating wattmeter for effecting a driving connection between said rotary switching device and said integrating wattmeter when said indicating meter measures power in excess of a predetermined value.

4. In a system of distribution, the combination with a translating device, and an integrating and an indicating wattmeter in circuit therewith for respectively registering and indicating the power consumed thereby, of a rotary switching device adapted to effect the interruption of the translating device circuit, electromagnetic means for operatively associating said switching device with the shaft of said integrating meter, whereby said switching device is driven in proportion to the amount of power consumed by said translating device, and co-operating stationary and movable contact members associated with said indicating wattmeter for completing the circuit of said electromagnetic means when and as long as the effective value of power consumed by said translating device exceeds a predetermined amount.

5. The combination with an integrating wattmeter, a movable member biased to its initial position and adapted to be moved in proportion to the amount of energy passing through said integrating wattmeter, and means for operatively associating said movable member with said wattmeter, of an indicating wattmeter adapted to control the operation of said associating means.

6. The combination with a switching device, translating means, means for registering the power consumed thereby, and means for actuating said switching device when the power consumed during a predetermined time interval exceeds a predetermined amount, of means dependent upon a predetermined effective value of power for controlling the operation of said actuating means.

7. The combination with an electrical power-registering instrument, an electrical power-indicating instrument, and a switching device, of means dependent upon the action of said registering instrument and said indicating instrument for actuating said switching device when the electrical quantity of energy registered by said registering instrument exceeds a predetermined amount in a given time.

8. The combination with an electrical power-registering instrument, means for indicating effective values of power, and a switching device, of means for actuating said switching device when the total integrated power continuously passing through said instrument in excess of a predetermined effective value exceeds a predetermined amount in a given time.

9. The combination with a switching device, means for quantitatively registering electrical energy, and means for indicating electrical energy, of a movable device adapted to be operated by said registering means, means dependent upon said indicating means for effecting operative engagement of said movable device and said registering means, and means dependent upon the operation of said movable device for actuating said switching device.

10. The combination with a switching device and translating means, of means embodying an integrating and an indicating wattmeter in circuit therewith for actuating said switching device when the power continuously consumed by said translating means in excess of a predetermined effective value exceeds a predetermined amount in a given time.

11. The combination with a circuit interrupter, and an integrating wattmeter and an indicating wattmeter in circuit therewith, of a rotatable member adapted to be operatively associated with said integrating wattmeter, means dependent upon the action of said indicating wattmeter for effecting said operative engagement and maintaining the same under predetermined power conditions, and means associated with said rotatable member for opening said circuit interrupter when said rotatable member is actuated a predetermined amount.

In testimony whereof, I have hereunto subscribed my name this 3rd day of Jan. 1911.

PAUL M. LINCOLN.

Witnesses:
R. K. CULBERTSON,
B. B. HINES.